United States Patent [19]
Cornelius

[11] 3,800,939
[45] Apr. 2, 1974

[54] REMOVABLE VEHICLE TRAY
[76] Inventor: Victor W. Cornelius, Eastland, Tex. 76448
[22] Filed: July 2, 1971
[21] Appl. No.: 159,399

[52] U.S. Cl. ............. 206/19.5 R, 220/22, 220/97 E
[51] Int. Cl. ..... B60n 3/10, B65d 21/02, B65d 25/06
[58] Field of Search...... 206/19.5 R; 220/22.5, 22.1, 220/22, 97 E

[56] References Cited
UNITED STATES PATENTS

| | | | |
|---|---|---|---|
| 3,315,798 | 4/1967 | Mathison | 206/19.5 R |
| 3,316,924 | 5/1967 | Ware | 206/DIG. 8 |
| 3,436,008 | 4/1969 | Santangelo | 220/22 X |
| 110,991 | 1/1871 | Miller | 220/22 |
| 733,002 | 7/1903 | Burgess | 220/22 |
| 2,925,675 | 2/1960 | Lumpkin | 206/DIG. 18 |
| 2,746,457 | 5/1956 | Musacchia | 220/22.5 X |

FOREIGN PATENTS OR APPLICATIONS

| | | | |
|---|---|---|---|
| 1,158,440 | 11/1963 | Germany | 220/97 E |
| 215,280 | 9/1967 | Sweden | 220/97 E |

Primary Examiner—Leonard Summer
Attorney, Agent, or Firm—Richards, Harris & Medlock

[57] ABSTRACT

A molded plastic container is removably connectable to an autombile seat, dash or other surface by a hook and pile fastener. The pile member is temporarily attached to the seat by a pressure sensitive adhesive. The hook member of the fastener is attached to the bottom of the container. A flange or lip extends outwardly from the top edges of each of the upstanding walls. A U-shaped arm pivoted near one end of the container fulfils the function of dividing the container into two sections if desired. Another embodiment utilizes a pair of slidable divider bars including hooks which embrace the flanges. They are frictionally held in place by the combination of flanges which are widened in their midsection and the resilient deformation of the flanges and elongate side walls.

5 Claims, 11 Drawing Figures

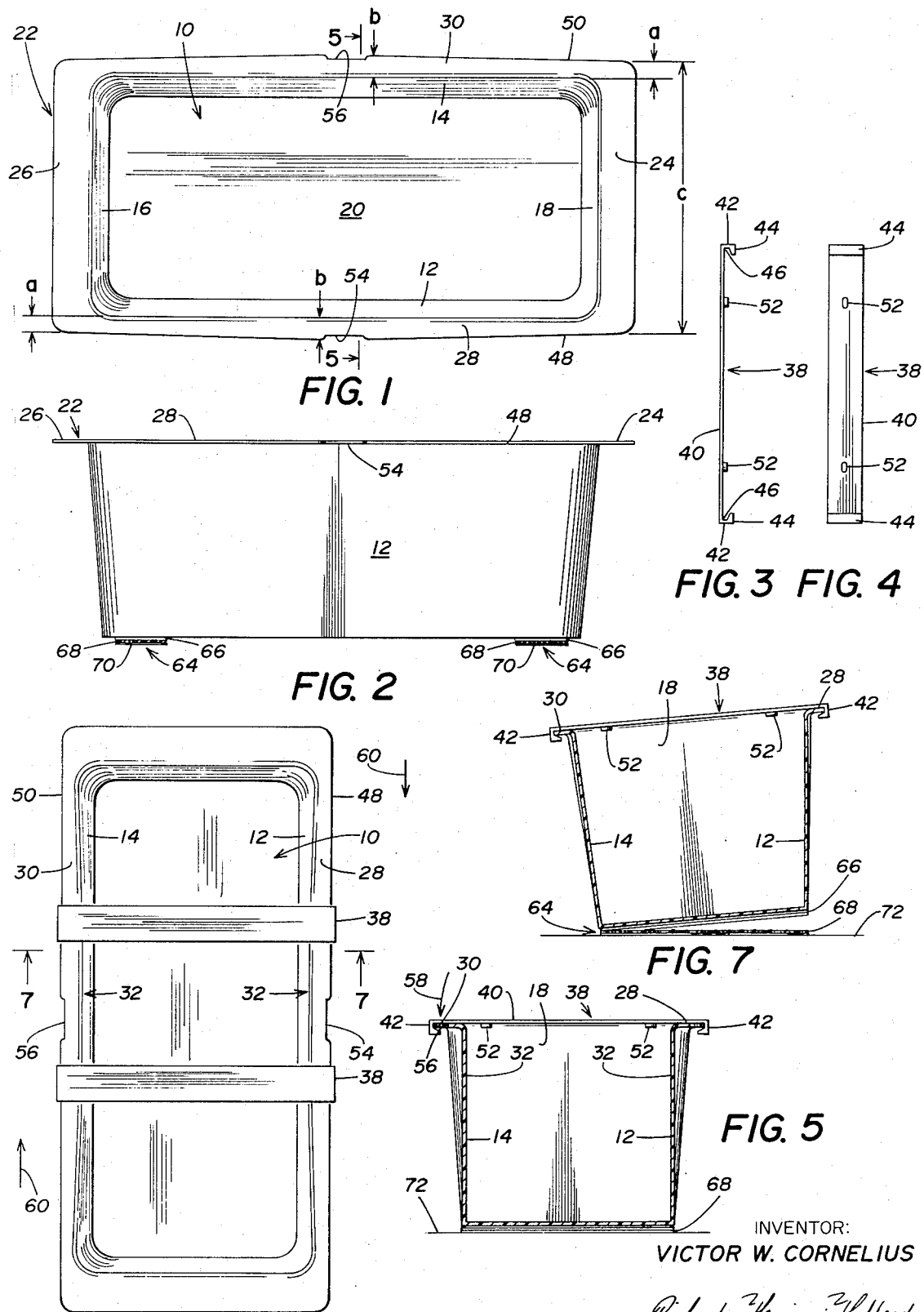

INVENTOR:
VICTOR W. CORNELIUS 3,800,939

REMOVABLE VEHICLE TRAY

DESCRIPTION OF THE PRIOR ART

This invention relates to containers and more particularly to containers removably secured to seats or the like in motor vehicles.

Containers for drinks and miscellany in motor vehicles have been utilized since the advent of such vehicles. These containers have varied from multi-receptacle trays to single-receptacle tumbler holders. Generally, the prior art devices have either been permanently installed or have been made merely to rest upon a seat. Other receptacles have been weighted to prevent movement on a seat or the like when accelerating, decelerating or cornering. Other prior art containers have been designed to include weighted flaps which extend over each side of the transmission tunnel in an automobile.

These prior art devices have not been completely satisfactory. For example, many users do not desire permanent mounting of a container or receptacle in a motor vehicle. Additionally, the counterweighted devices, although easily removable, do not effectively prevent a beverage from spilling from a container, and do not always stay in a desired position. The prior art devices do not readily accommodate drink containers of different size.

SUMMARY OF THE INVENTION

The present invention overcomes many of the disadvantages of the prior art devices. The present invention combines the advantages of a semi-permanent installation with easy removability. The present invention is compact yet is adjustable to accommodate different sized beverage containers.

One form of the present invention provides an open molded container comprising a receptacle having flanges attached along at least two sides of the top thereof, a divider member pivotally mounted to said receptacle and movable between a first and a second position, said divider member in said first position dividing the container into two portions, said divider member in said second position allowing access to the entire container.

Another form of the present invention, therefore, provides a molded plastic container comprising a recessed portion defined by side walls and a bottom, at least two of the side walls being substantially parallel and elongate with respect to the other side walls, integral flanges extending outwardly from the top margin of the elongate side walls, and a transverse slidable bar engaging the flanges for movement substantially along the length of the elongate side walls to provide an adjustable division of the recessed portion of the container.

In accordance with another aspect of the invention, at least one hook and pile fastening means is connected to the bottom of the container to disconnectably attach the container to an automobile seat or the like. The hook member of the fastener is relatively permanently attached to the container by a suitable adhesive. The back of the pile member is provided with a pressure sensitive adhesive protected by a waxed sheet or the like. When the protective sheet is removed, the pressure sensitive adhesive will bond to a vinyl seat with sufficient tenacity to permit separation of the hook and pile fastener, leaving the pile member fastened to the seat.

BRIEF DESCRIPTION OF THE DRAWINGS

The ensuing specification will be more easily understood by a reading thereof in conjunction with the accompanying drawings, wherein:

FIG. 1 is a top view of the container of the present invention;

FIG. 2 is a side elevation view of the container of the present invention;

FIG. 3 is a side view of the slidable member for engagement with the container shown in FIGS. 1 and 2;

FIG. 4 is a bottom view of the slidable member of FIG. 3;

FIG. 5 is a sectional view of the container taken along section line 5—5 of FIG. 1 except that the side walls are deformed to illustrate application of the slidable member to the container;

FIG. 6 is a top view of the container of the present invention illustrating in part the operation of the slidable member;

FIG. 7 is a sectional view of the container shown in FIG. 6 taken along section line 7—7 thereof;

DESCRIPTION OF PREFERRED EMBODIMENT

Figure 8:
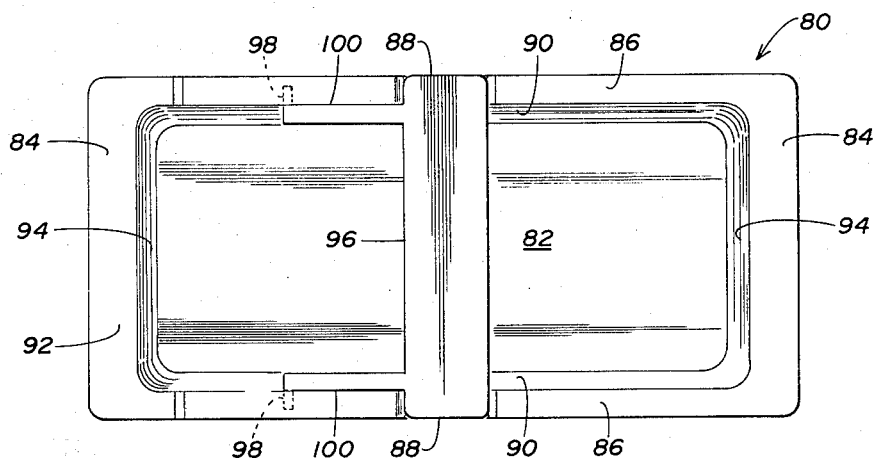
FIG. 8 is a top view of another embodiment of the present invention.

The present invention will be described in relation to several embodiments. It is to be understood that various modifications, changes, substitution of equivalents and other alterations can be made without departing from the inventive concept. It is intended that the present invention shall be limited only by the appended claims. Like numerals will be used in the ensuing specification to indicate the same or similar portions of the invention.

Referring now to FIGS. 1 and 2, a top and side view, respectively, of the container of the present invention is illustrated. The container includes a recessed portion or receptacle 10 defined by elongate side walls 12 and 14, end walls 16 and 18 and a bottom 20. In the preferred embodiment the recess 10 is of substantially rectangular cross-section in the horizontal plane. Integrally connected to the top portion of the side walls is a peripheral flange generally designated 22. The peripheral flange 22 is continuous around the top of the recess 10. The peripheral flange end portions 24 and 26 contiguous with the end walls 16 and 18 provide lateral reinforcement to the receptacle 10. The walls 12 through 18, the bottom 20, and the peripheral flange 22 have generally the same thickness.

The side flange portions 28 and 30, contiguous with the elongate side walls 12 and 14, respectively, have a predetermined width at the ends thereof as indicated by dimension $a$. This dimension increases gradually to a point near the center of the elongate flange portions 28 and 30 such that the dimension $b$ is larger than the dimension $a$.

The entire container in the preferred embodiment is of integral construction. It is preferably injection molded from a synthetic thermoplastic polymeric material such as, for example, polypropylene. In the preferred embodiment, it is preferred that the material be relatively semirigid, however, it should exhibit some deformability without damage and it should exhibit, at least with respect to one aspect of the invention, a certain amount of resiliency as will be explained hereinafter with respect to the slidable member, illustrated in FIGS. 3 and 4.

When the container of the present invention is initially molded, it is desirable that the top portion of the recess 10 defined by the tops of upstanding side walls 12 and 14 are substantially parallel as illustrated in FIG. 1. The flexibility and resiliency of the material utilized should be exhibited in the region of the center of outwardly extending flange portions 28 and 30 as indicated generally by reference numeral 32 (FIGS. 5 and 6). This is made possible by properly sizing the thickness of the sidewalls 12 and 14 and the width of the outwardly extending flange portions 28 and 30. In the preferred embodiment, the thickness of the side walls and the peripheral flange 22 is generally on the order of one-sixteenth of an inch. The dimension $a$ is on the order of one-fourth of an inch, the dimension $c$ on the order of 3 ⅞ inches, and the dimension $b$ on the order of 11/32 inch.

Referring now to FIGS. 3 and 4, a slidable member to engage the elongate flange portions 28 and 30 includes a top portion 40 of greater width than dimension $c$ of the container. The top member has integral therewith downwardly extending portions 42 and inwardly extending portions 44. Portions 42 and 44 define flanges or grooves 46 of sufficient depth, i.e., greater than about one-sixteenth of an inch for the preferred embodiment, to engage the outer edges 48 and 50 (FIGS. 1 and 2) of elongate outstanding flange portions 28 and 30. The top portion 40 of the slidable member has integrally connected to the bottom side thereof two downwardly extending pegs or stop members 52 which prevent removal of the slidable member from the ends of the container after it is once installed to engage sides 48 and 50.

As can be seen by reference to FIG. 5, which is a cross section of a container as shown in FIG. 1, similar to one taken along section line 5—5 thereof, the insertion of a slidable member 38 onto the rails formed by edges 48 and 50 of the elongate flange portions 28 and 30 is illustrated. Indented portions 54 and 56 are provided near the center of elongate flange portions 28 and 30 (FIG. 1) along the outer edges 48 and 50. The indented portions 54 and 56 are slightly wider than the width of the slidable member 38. One flange 46 of the slidable member 38 is hooked over the flange portion 28 as shown in FIG. 5 while the deformably resilient side walls 12 and 14 are depressed inwardly toward each other, for example, by the fingers of one hand. The other flange 42 is then moved in the direction of arrow 58 so that the bottom side of the slidable member 38 is in contact with the top surface of sidewardly extending flange portion 30. The resilient sides 12 and 14 are then released, thus bringing the sidewardly extending flange portion 30 into engagement with the other flange 42.

As will be seen from FIG. 6, as the slidable members 38 are moved from the end of the container in the direction of arrow 60, they cause a slight deformation of the walls 12 and 14 of the container. Since the walls are resilient, a force is applied outwardly against the flanges 46 of the slidable members 38 by the walls and sidewardly extending flange portions 28 and 30. This force, conjunctively with the frictional force between the flanges of the slidable member and the edges 48 and 50 of the flange portions, combines to provide a frictional stop or retention means for any given position of the slidable members 38. Thus, the top opening of the receptacle 10 can be adjusted to accommodate insertion of different sized articles. Additionally, the slidable members 38 will prevent spillage or tipping of tumblers, bottles, cans or the like since vertical support is provided on four sides of the tumbler. As shown in FIG. 6, the receptacle 10 can accommodate three tumblers or the like in the configuration shown.

Referring now to FIGS. 2, 5 and 7, two strips 64 of a material commonly marketed under the trade name "Velcro" are applied by means of adhesive to the bottom portion of the container. "Velcro" is a separable material usually consisting of two flexible strips. One of these strips contains a pile fabric while the other strip contains a plurality of small hook members. When intimately contacted, the hook members grip the pile fabric preventing separation unless substantial force is applied. This type of hooked pile fabric strip is disclosed generally in U.S. Pat. Nos. 2,820,277 and 2,717,437. Preferably, the flexible hook strip indicated as 66 in the drawings containing the hook members is adhesively secured to the bottom of the container. The pile strip designated as 68 is supplied with a coating of pressure sensitive adhesive on the bottom which is protected by a thin flexible protective strip 70. The protective strip 70 is peeled from the pile strip 68 to expose the pressure sensitive adhesive which is then pressed against the seat in a motor vehicle, for example. The pressure sensitive adhesive provides a sufficiently strong bond between the pile member and the seat or other clean, smooth surface to cause the pile and hook fastener to separate when the force is applied to the container, rather than the pile member separating from the seat. The container can then be replaced when needed by recoupling the hook and pile fasteners. The pile member does not materially interfere with normal use of the seat, and when desired, can be separated from the seat without damage to the seat.

In FIG. 5, the cross sectional view of the container is shown secured to a representative surface 72 by means of the adhesive on the bottom side of pile strip 68. As shown in FIG. 7, the container including the hook strip 66 can be separated from the pile strip 68. Thus, the container can be stored when it is desired to utilize surface 72 for purposes other than holding the container, for example, when the middle portion of a front seat of a motor vehicle must be utilized for a passenger. When it is desired again to utilize the receptacle for holding tumblers and the like, the container is merely replaced on the semi-permanently attached strips 68 in the surface 72.

As can be seen in FIG. 7, the stop members 52 on the bottom portion of slidable member 38 will contact the upper portion of end wall 18 if an attempt is made to slide the member off the end of the container. Thus the stop members 52 provide a convenient means for preventing loss of the slidable members 38.

Figure 9:
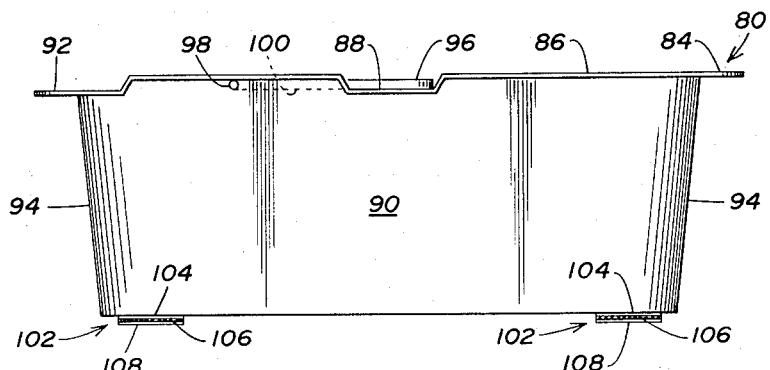
FIG. 9 is a side view of the embodiment of FIG. 8.

FIGS. 8 and 9 illustrate another embodiment of the present invention. The container, generally designated 80, has a receptacle portion 82 similar to that described in conjunction with the above embodiment. Flanges 84 extend outwardly from the top of the end walls of the receptacle 82. A second set of flanges 86 contiguous with the flanges 84 extend outwardly from the sides of the receptacle 82. The flanges 86 can be of uniform width from end to end. Downwardly extending recessed portions 88 are provided near the center of flanges 86 and opposite each other. The recessed portions extend below the top of side walls 90 of the receptacle portion 82. A second recessed portion 92 is provided at one end of the container 80. The recessed portion 92 begins along a line inside end wall 94 and extends beyond end wall 94. The flange 84 extending outwardly from the end wall 94 forms part of the recessed portion 92.

Figure 10:
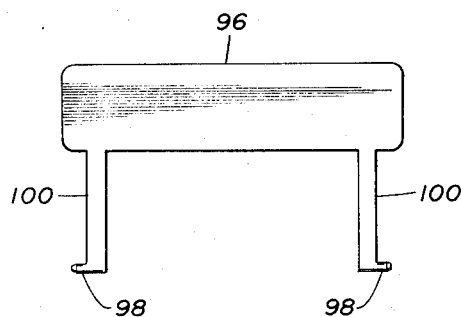
FIG. 10 is a plan view of the movable divider shown in FIGS. 8 and 9.

A movable divider member 96 is pivotally mounted intermediate the recessed portions 88 and 92. Two holes are provided in side walls 90 into which pivot rods 98 extend. Pivot rods 98 are connected to arms 100 which are in turn connected to divider member 96. The length of recessed portions 88 is slightly greater than the width of divider member 96 such that the divider member 96 can fit flush or below the upper surface of flanges 86. FIG. 10 shows a plan view of the divider member 96, arms 100, and pivot rods 98.

Figure 11:
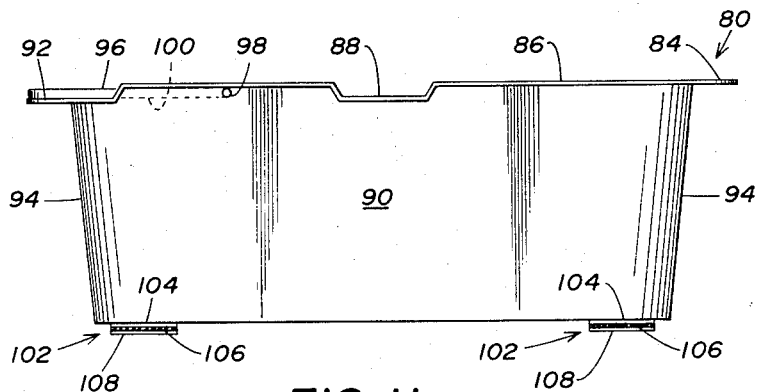
FIG. 11 is a view similar to FIG. 9 showing the divider in a second position.

The holes through which rods 98 extend are located intermediate recessed portions 88 and 92. The length of the arms 100 are chosen such that the divider member 96 will rest in recesses 88 as shown in FIGS. 8 and 9 to divide the receptacle portion 82 of the container 80 into two portions. In this configuration the receptacle 82 can readily accept two containers such as tumblers or the like. When the divider member 96 is pivoted to its second position as shown in FIG. 11 the full receptacle 82 is exposed. Thus the container can be utilized for small boxes of disposable tissues or other items requiring more space than a tumbler.

As shown in FIGS. 9 and 11, two strips generally designated 102 of "Velcro" can be applied by means of an adhesive to the bottom portion of the container 80. As above a flexible hook strip 104 is adhesively secured to the bottom of the container 80. A pile strip 106 supplied with a coating of pressure sensitive adhesive on the bottom thereof is shown connected to the hook strip 104. A thin flexible protective strip 108 contacts the adhesive on the bottom of pile strip 106 until the container is ready for application to a surface in a motor vehicle or the like.

As above, the container 80 including receptacle portion 82, flanges 84 and 86, and recessed portions 88 and 92 can be integrally molded from a suitable thermoplastic material. The divider member 96 including arms 100 and pivot rods 98 can be separately molded from the same material. Preferably the material should be chosen such that the arms 100 are sufficiently flexible and resilient to facilitate assembly of pivot rods 98 into the holes provided therefor.

What is claimed is:

1. An open molded container comprising:
a receptacle defined by a bottom, two side walls and two end walls having flanges extending along the top of said side walls, said flanges, walls and bottoms being integrally molded from a plastic material;
a divider member having opposite arms connected to a divider bar in a general U-shape with the arms being pivotally mounted in the receptacle side walls and movable between first and second positions, said first position placing the divider transversely of said side walls and intermediate said end walls to separate the container into two compartments, at least one of said compartments being adapted to receive and stabilize an ordinary hand-held beverage container, the second position placing the divider in a position adjacent one of the end walls to allow substantially unobstructed placement of an object larger than said container in said receptacle,
said walls and flanges being recessed to receive the divider bar in each of the positions, and
a separable fastening means attached to the exterior surface of said bottom, said separable fastening means including a first separable member having a plurality of engageable hooks thereon and a second separable member comprising a pile member removably engageable with said first member, one of the separable members being attached to said exterior of said bottom portion, and the other of said separable members including means for attaching the receptacle to a surface.

2. The container of claim 1 wherein said one member capable of attachment to said surface having an adhesive means applied to the side opposite from said removably engagable side, and a removable protective tape applied over said adhesive to prevent premature adhesion to unselected surfaces.

3. The container of claim 2 wherein said separable means comprises at least two spaced apart strips.

4. An open molded container comprising:
a receptacle defined by a bottom, two side walls and two end walls having flanges extending along the top of said side walls, said flanges, walls and bottoms being integrally molded from a plastic material;
a divider member having opposite arms connected to a divider bar in a general U-shape with the arms being pivotally mounted to the receptacle sidewalls and movable between a first position extending transversely of said side walls to separate the container into two compartments, at least one of said compartments being adapted to receive an ordinary hand held beverage container, and a second position adjacent to one of the end walls to allow substantially unobstructed access to the entire container interior;
a first recessed portion in the side walls of said receptacle and in the flanged portion for receiving said divider member in said first position, a second recessed portion in said flanges, end wall and side walls for receiving said divider member in said second position;
a separable fastening means attached to the exterior surface of said bottom, said separable fastening means including a first separable member having a plurality of engageable hooks thereon and a second separable member comprising a pile member removably engageable with said first member, one of separable members attached to said exterior of said bottom portion, the other of said separable members capable of being attached to a surface.

5. An open molded container comprising:
a receptacle defined by a bottom, two side walls and two end walls, the receptacle being approximately twice as long as wide, a single divider member having opposite arms connected to a divider bar in a general U-shape with the arms being pivotally mounted to the receptacle side walls at a point approximately half way between an end wall and the center of the receptacle and movable between first and second positions, said first position placing the divider transverse said side walls to separate the container into two substantially equal compartments, the second position substantially aligning the divider with said one end wall to allow substantially unobstructed access to the entire container interior; and a separable fastening means attached to the exterior surface of said bottom, said separable fastening means including a first separable member having a plurality of engageable hooks thereon and a second separable member comprising a pile member removably engageable with said first member, one of separable members attached to said exterior of said bottom portion, the other of said separable members capable of being attached to a surface.

* * * * *